Dec. 3, 1929.  A. MELDRUM  1,737,935
VEHICLE WHEEL
Filed May 12, 1926   2 Sheets-Sheet 1
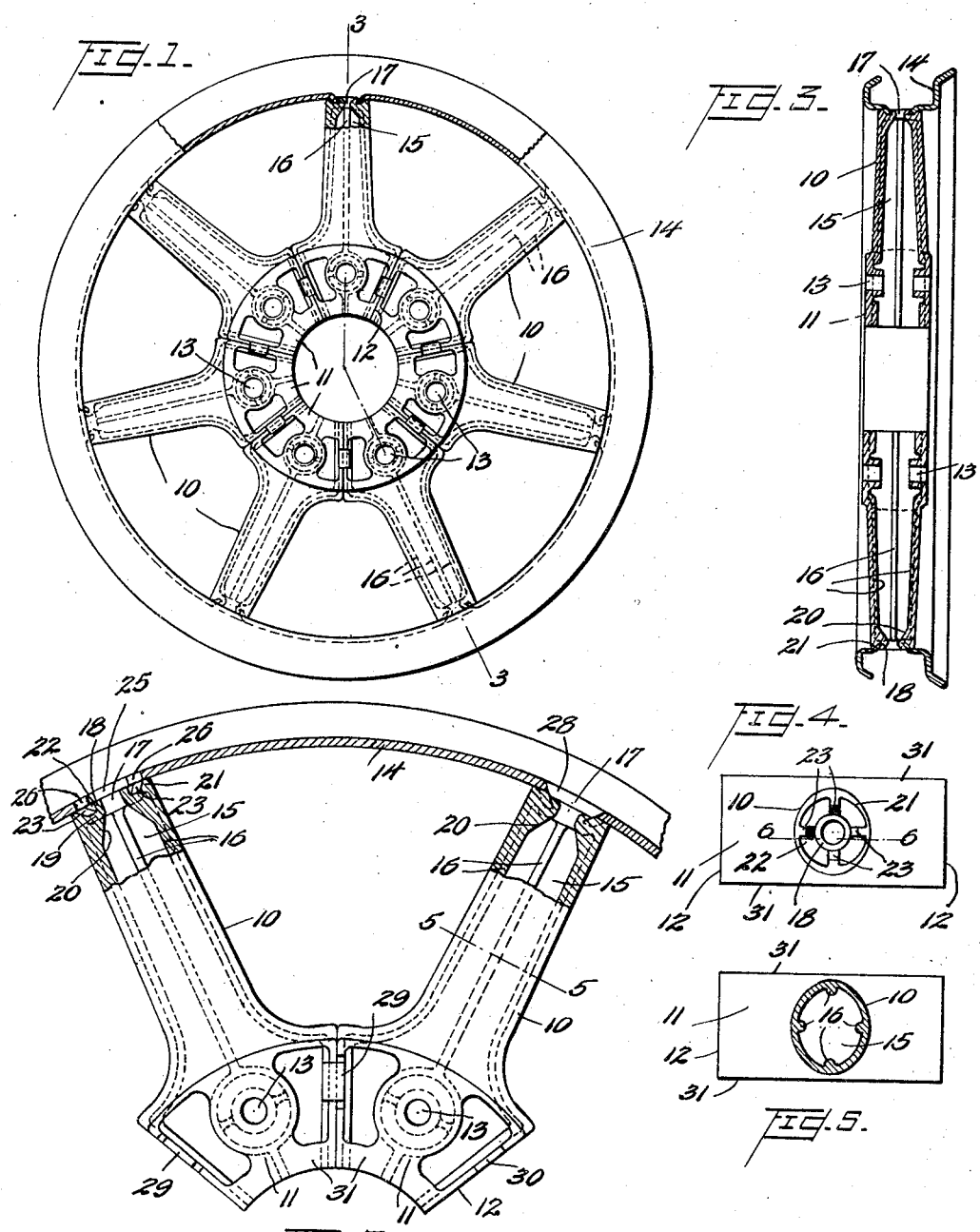

Dec. 3, 1929.   A. MELDRUM   1,737,935
VEHICLE WHEEL
Filed May 12, 1926   2 Sheets-Sheet 2
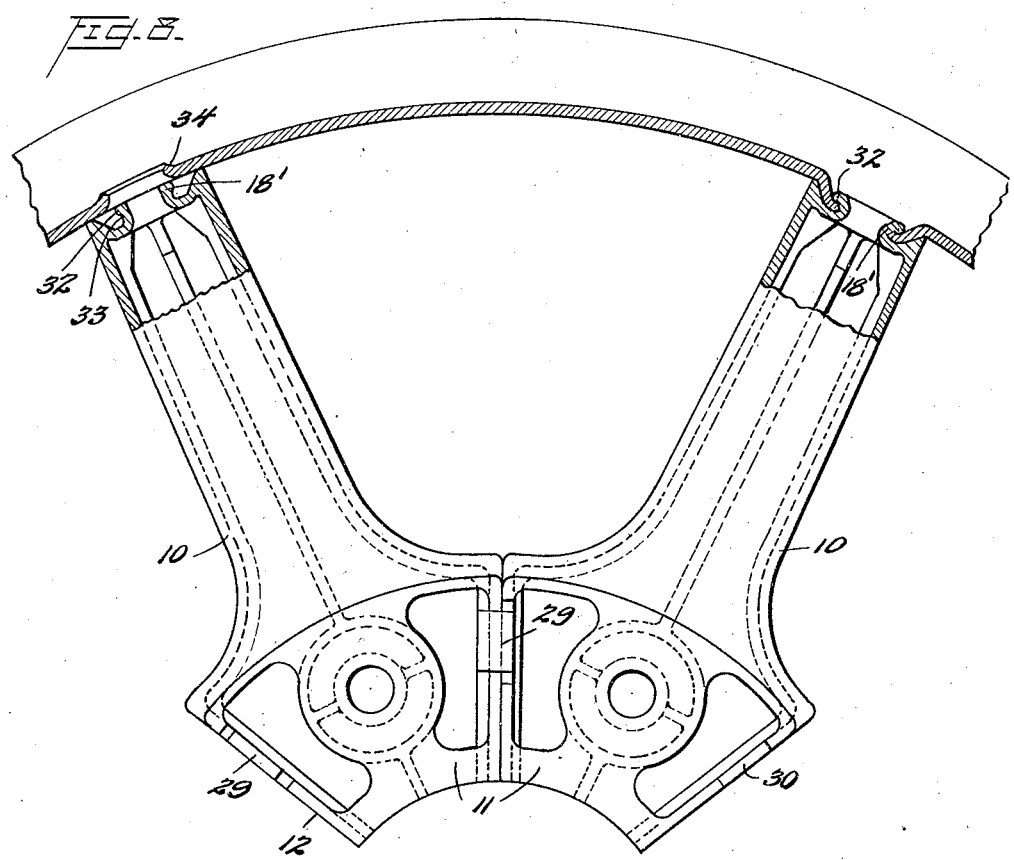
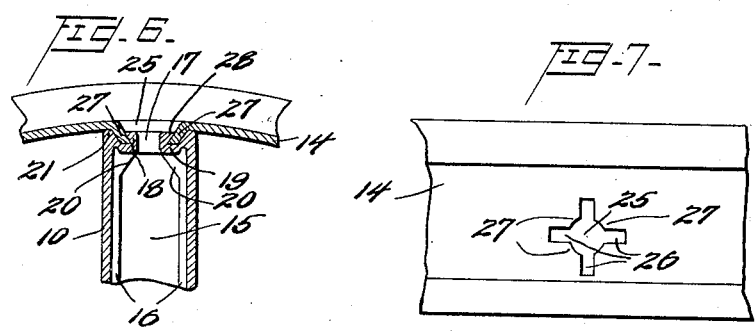
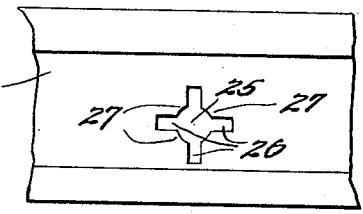

Patented Dec. 3, 1929

1,737,935

UNITED STATES PATENT OFFICE

ALEXANDER MELDRUM, OF SYRACUSE, NEW YORK, ASSIGNOR, BY MESNE ASSIGNMENTS, TO HURLBURT W. SMITH AND WILBERT L. SMITH, BOTH OF SYRACUSE, NEW YORK

VEHICLE WHEEL

Application filed May 12, 1926. Serial No. 108,677.

This invention relates to vehicle wheels, and more particularly to metal vehicle wheels provided with individual spokes connected together at their outer ends by a felloe and forming at their inner ends a hub-like bearing receiving portion.

It is a general object of the present invention to provide a novel and improved form of all metal spoked wheel.

More particularly it is an object of the present invention to provide a novel and improved method of securing the spoke ends into the felloe.

It is a further object of the present invention to provide a novel method of assembling spoked vehicle wheels.

A still further object of the present invention consists in the provision of a novel joint for securing together the outer end of a spoke and the metal felloe of a vehicle wheel.

Other and further objects will be more apparent as the description proceeds..

For a complete understanding of the present invention, reference should be had to the accompanying drawings and following specification wherein are disclosed two exemplary embodiments thereof, with the understanding, however, that various changes may within the scope of the appended claims be made therein, by those skilled in the art, without departing from the spirit of the invention.

In said drawings:

Figure 1 is a side elevation, partially broken away, of a wheel constructed according to the present invention;

Figure 2 is an enlarged view of two spokes of the same, the ends thereof and the felloe being sectioned on the median plane of the wheel;

Figure 3 is a section on line 3—3 of Fig. 1;

Figure 4 is an end view of a spoke looking from the outer end;

Figure 5 is a section on line 5—5 of Fig. 2;

Figure 6 is a section on line 6—6 of Fig. 4, but showing the felloe in place and the spoke ends riveted thereto;

Figure 7 is a view of a portion of the felloe looking in a radial direction and showing a spoke receiving opening, and Figure 8 is a view similar to Fig. 2, but showing a modified form of fastening means.

The present invention relates to all metal vehicle wheels composed of a plurality of spokes having enlarged inner ends provided with abutting radial faces, which, when assembled, together form a hub member. The spokes radiate from this hub member and have their outer ends secured in a metal felloe. The invention is particulary directed to the method of assembling the felloe over the spokes and to the joint for securing the spoke ends into the felloe, and can hence be applied with equal facility to a wheel in which the spoke spider is an integral casting or one cast in several sections.

Referring particularly to Figs. 1 to 7, it will be seen that a plurality, here shown as seven, of hollow metal spokes 10 are provided, having the enlarged inner ends 11 in the form of segments. Each segment has two radial faces 12, so that when a plurality of the spokes are assembled together the segments 11 form a ringlike hub member adapted to receive finishing plates, not shown, one on either side thereof, which are secured by bolts passing through the holes 13 in the spokes. The spoke ends pass through and are secured in the metal of the felloe 14.

The spokes are preferably, but not necessarily, formed of malleable iron castings which are hollow for the sake of lightness, as shown at 15. In transverse section they may be circular, elliptical or of any desired form, as shown in Fig. 5, and for the sake of strength and rigidity provided with the longitudinal interior ribs 16 which extend into the hub forming portions to reinforce the same.

The outer end of each spoke is substantially closed except for the small passageway or opening 17 through the securing stud 18 on its end. The end wall 19 supporting this securing stud is reinforced by the gussets 20 co-extensive with the ribs 16. The general outer surface of the end of the spoke is shaped to conform to the interior configuration of the felloe, and in this cylindrical surface lie the end of the securing stud 18 and the outer felloe abutting shoulder 21 between which and the stud is the channel or groove 22, partially interrupted by the webs 23, best shown in Figs. 2 and 4. This channel has its inner wall, formed by the stud, parallel to the axis of the spoke, and its bottom wall substantially at right angles thereto or parallel to the inner surface of the felloe. The third or outer wall of the channel is conical in configuration. The inner ends of the webs 23 are substantially parallel to this conical wall, as shown in Fig. 2, and are not secured to the stud.

In order to receive the securing studs on the spokes, the felloe is pierced opposite each spoke end, as shown in Fig. 7, by a hole 25 of the proper shape to receive this central stud, which need not be circular as shown in the figure. The metal around the hole 25 is adapted to be swedged into the groove or channel 22 surrounding the securing stud, and in order that it may pass down alongside the ribs 23, the radial slots 26 are provided adapted to coincide with these ribs. In Fig. 2, the right hand spoke shows the material of the felloe swedged down into this channel and the end of the securing stud swedged or riveted over on top of the inturned metal of the felloe and the exposed edges of the webs 23, as at 28, to thus securely fasten the spoke end to the felloe. The purpose of the webs 23 is to fill up the spaces formed by the slots 26 surrounding the opening 25 in the felloe. These slots materially add to the ease with which the tongues 27, contained between the slots, may be swedged or bent into the channel surrounding the securing stud. They also function in an effective manner to prevent any possible rotation of the spoke about its axis in respect to the felloe.

To assemble a wheel, the requisite number of spokes are arranged together in the form of a spider and are secured to each other for ease in handling by the interlocking tongues 29, which may be bent over into the notches 30 in the adjacent spokes. This method of securing the spokes together at their hub ends is fully described in my copending application Serial No. 88,452, filed February 15, 1926.

The cast spokes have previously been faced on the surfaces 31, on the radial faces 12, and on the ends, so that when assembled as just described, the spokes from the center of the wheel to the cylindrical end are several thousandths of an inch greater in length than the radius of the inner surface of the pressed metal felloe 14. The felloe is heated to cause it to expand until it will slip over the spider and is properly positioned with the openings 25 in line with the openings 17 in the spoke ends. Upon cooling, it shrinks and tightly abuts the shoulders 21 at the ends of the spokes, securely holding the spokes together and in their correct positions. The tongues 27 are then swedged or driven into place and the securing stud riveted, swedged or spun over on top of the same, completing the wheel, which is found in actual practice to be several pounds lighter than the corresponding wood wheel and considerably stronger, in spite of the fewer number of spokes, which, by reason of their wide spacing are easily cleaned. The wheel is free from any annoying squeaks and there is no possibility of loosening spokes due to changes in weather conditions.

The inturned portion of the felloe abuts against the securing stud and the outer wall of the channel surrounding the same, thus forming a double lock against displacement of the spoke in respect to the felloe, which materially adds to the strength of the wheel against collapse due to side thrust such as the striking of a curb during a skid. The provision of the groove surrounding the securing studs allows the use of a simpler method of assembling the wheel, for since the stud does not extend beyond the general end of the spoke, the group of spokes can be assembled into a spider and slipped into the expanded felloe quite simply. If it is not desired to expand the felloe by heat, the lengths of the spokes may be made such that the spider can just pass within the felloe, which is then reduced in diameter in a suitable form of press, by the method used in sizing felloes, until it tightly clamps the spokes in the proper position previously described.

In Fig. 8 is shown a slightly modified method of securing the spoke ends to the felloe. Here the webs between the stud and the outer portion of the spoke end have been omitted, and the stud 18' is provided with an exterior bead 32 at its outer end. The felloe is first punched or pierced with a hole of a diameter equivalent to the diameter of the neck 33 of the stud, and is then formed over outwardly, as shown at 34, until its interior diameter is large enough to pass over the bead 32. This furnishes additional stock, which can be formed closely around the small diameter or neck of the stud, as shown in the right hand spoke in Fig. 8, after which the stud is spun, swedged or riveted over as in the previous form. The material as shown at 34 is formed over outwardly in order to be out of the way when the spoke spider is assembled into the felloe as previously described.

Having thus described the invention, what is claimed as new and desired to be secured by Letters Patent is:

1. In a spoke for a vehicle wheel, in combination, a tubular portion, a hollow stud on the end thereof, a felloe abutting shoulder spaced from said stud by a channel, the outer faces of said stud and shoulder lying in the surface of a cylinder of a radius equal to the radius of the inner periphery of the wheel felloe.

2. In a vehicle wheel, in combination, a felloe having an aperture therein and slots radiating therefrom forming tongues between said slots, a spoke having the general shape of its outer end conforming to the curvature of said felloe, a channel in the end of said spoke defining a fastening stud, webs extending inwardly from the outer wall of said channel, the aperture of said felloe passing over said stud, said tongues being formed into said channel between said webs, and said stud being formed over said tongues and webs.

3. A spoke for a vehicle wheel including in combination, a stud on the outer end of said spoke, a felloe abutting shoulder spaced from said stud by a channel, the outer face of said shoulder lying substantially in the surface of a cylinder of a radius equal to the radius of the inner periphery of the wheel felloe and said stud being entirely within said cylinder.

In testimony whereof I hereunto affix my signature.

ALEXANDER MELDRUM.